(12) United States Patent
Frost et al.

(10) Patent No.: US 7,967,562 B2
(45) Date of Patent: Jun. 28, 2011

(54) CERAMIC MATRIX COMPOSITE CAPPED BOLT ATTACHMENT

(75) Inventors: Allen R. Frost, Wethersfield, CT (US); John D. Riehl, Hebron, CT (US)

(73) Assignee: United Technologies Corporation, Hartford, CT (US)

( * ) Notice: Subject to any disclaimer, the term of this patent is extended or adjusted under 35 U.S.C. 154(b) by 1669 days.

(21) Appl. No.: 11/447,441

(22) Filed: Jun. 6, 2006

(65) Prior Publication Data

US 2007/0280822 A1  Dec. 6, 2007

(51) Int. Cl.
*F01D 25/26* (2006.01)

(52) U.S. Cl. ..... 415/197; 415/134; 415/200; 415/214.1; 29/525.02; 29/525.11; 29/525.12; 29/889.2; 403/30; 60/766; 60/770; 60/797; 411/372.6; 411/383; 411/901; 411/904

(58) Field of Classification Search ............ 415/134, 415/136, 139, 175–178, 200, 214.1, 196–197; 29/525.02, 525.11, 525.12, 889.2; 403/28–30, 403/408.1; 60/766, 770, 797; 411/372.5, 372.6, 383, 900, 901, 904
See application file for complete search history.

(56) References Cited

U.S. PATENT DOCUMENTS

| 1,194,792 | A | * | 8/1916 | Stewart | 411/338 |
| 4,575,047 | A | * | 3/1986 | Boos et al. | 251/356 |
| 5,133,618 | A | * | 7/1992 | Mentesh | 403/369 |
| 5,391,028 | A | * | 2/1995 | Charles | 411/374 |
| 5,497,616 | A | * | 3/1996 | Roberts | 60/765 |
| 6,302,630 | B1 | * | 10/2001 | Grant | 411/372.6 |
| 7,153,054 | B2 | * | 12/2006 | Arbona | 403/28 |

* cited by examiner

*Primary Examiner* — Christopher Verdier
(74) *Attorney, Agent, or Firm* — Carlson, Gaskey & Olds, PC

(57) ABSTRACT

A fastener for a turbine engine includes a bolt and a ceramic matrix composite (CMC) cap mechanically secured to the bolt. CMC components are attached to an exhaust nozzle case with the fasteners. The fastener includes a bolt made of metal and having a head. A CMC cap is located on the head of the bolt and secured to the bolt by a mechanical device. The mechanical device allows the CMC cap to have a different thermal expansion than the bolt. The CMC cap also acts as a thermal shield for the bolt, aiding in the reduction of a heat signature of the turbine engine.

10 Claims, 4 Drawing Sheets

CERAMIC MATRIX COMPOSITE CAPPED BOLT ATTACHMENT

The US Government may have certain rights in this invention in accordance with Contract Number N00019-02-C-3003 awarded by the United States Navy.

BACKGROUND OF THE INVENTION

The invention generally relates to an arrangement to fasten ceramic to metal components within a turbine engine.

Exhaust within and leaving turbine engines is at extremely high temperatures. The measured temperatures from the turbine engine and exhaust are known as an engine's heat signature. Turbine engines for use in military aircraft have performance requirements relating to reduced measured heat signatures. As the components of the turbine engine absorb heat, the heat signature of the turbine engine is increased.

Ceramic matrix composite (CMC) materials provide surfaces with a greater ability to absorb heat than the metal materials typically used in turbine engines. To reduce the absorption of heat by engine components resulting in a lower heat signature, a turbine engine exhaust nozzle is lined with CMC components. CMC components are attached to metal structural components of the turbine engine to line the interior of the engine.

CMC components are lighter than metal components, but raise the challenge of being difficult to attach to the metal structural components of the turbine engine. In part, this results from a reduced thermal growth rate of the CMC components when compared to the metal components. The CMC materials also have low ductility compared to the metal components and unless preload is applied, the CMC component will vibrate against the metal components, causing damage. Additionally, many applications require that the CMC components be attached using a CMC fastener, rather than a metal fastener.

Thus, when attaching the CMC materials to the metal structures in a turbine engine, it is desired for the fasteners to allow for the increased thermal growth of the metal structural components compared to the CMC components. Additionally, the fastener must apply a preload to the CMC component to reduce vibrations.

A fastener to secure CMC components to a metal structure in a turbine engine while applying preload and allowing for differing thermal growth rates is desirable.

SUMMARY OF THE INVENTION

An example fastener for a turbine engine according to this invention includes a bolt and a ceramic matrix composite (CMC) cap mechanically secured to the bolt.

Fasteners attach CMC components to an exhaust nozzle case of a turbine engine including a metal structure. The fasteners include a metal bolt including a head. A CMC cap is located on the head of the bolt and secured to the bolt by a mechanical device. The mechanical device allows the CMC cap to have a different thermal expansion than the bolt. The CMC cap also acts as a thermal shield for the bolt, aiding in the reduction of a heat signature of the turbine engine. Because the CMC cap covers the head of the bolt, no thermal barrier coatings are required for the bolt.

The fastener of the present invention supports and secures the CMC components to the metal structure, while providing for different thermal expansion rates for each component.

An example method of fastening components includes the steps of aligning a ceramic composite cap to at least partially cover a head of a metal member. The method places a mechanical attachment through a cap through hole in the ceramic composite cap and a member through hole in the metal member. The method includes mechanically attaching the ceramic composite cap to the metal member to form a fastener. In one example, the components are a ceramic composite fastener and a metal structural component.

The method may include aligning a ceramic through hole in the ceramic component with a structural through hole in the metal structural component. The method inserts the fastener through the ceramic through hole and the structural through hole to fasten the ceramic component to the metal structural component.

In one example, the mechanical attachment is a metal rivet, and the step of mechanically attaching comprises deforming a portion of the metal rivet with a rivet tool to retain the metal rivet within the cap through hole and the member through hole.

In another example, the mechanical attachment is a metal threaded member, and the step of mechanically attaching comprises threading an internally threaded locking nut into an external thread of the metal threaded member extended from the member through hole.

These and other features of the present invention can be best understood from the following specification and drawings, the following of which is a brief description.

DETAILED DESCRIPTION OF THE PREFERRED EMBODIMENT

Figure 1:
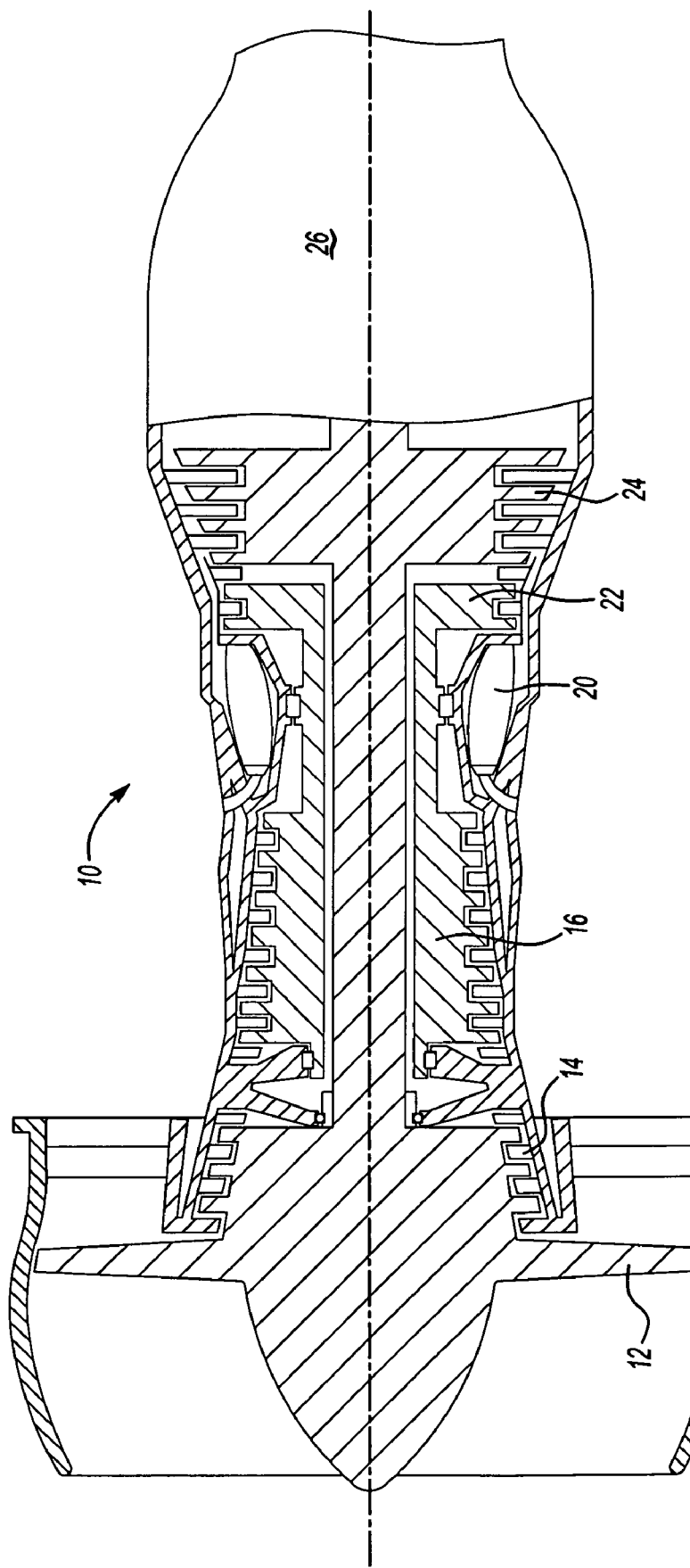
FIG. 1 is a schematic view of a turbine engine with an afterburner.

FIG. 1 is a schematic view of a turbine engine 10. Air is pulled into the turbine engine 10 by a fan 12 and flows through a low pressure compressor 14 and a high pressure compressor 16. Fuel is mixed with the air, and combustion occurs within a combustor 20. Exhaust from combustion flows through a high pressure turbine 22 and a low pressure turbine 24 prior to leaving the turbine engine 10 through an exhaust nozzle 26.

Exhaust within and leaving the exhaust nozzle 26 is at extremely high temperatures. The exhaust transfers heat to the components of the turbine engine 10, including the exhaust nozzle 26. As the components of the turbine engine 10 absorb heat from the exhaust, the heat signature of the turbine engine 10 is increased. To reduce the absorption of heat and to maintain a lower heat signature, the exhaust nozzle 26 is lined with ceramic matrix composite (CMC) components. The CMC components 28 (see FIG. 2) are typically liners that are secured to an exhaust nozzle case 30 including a metal structure.

Figure 2:
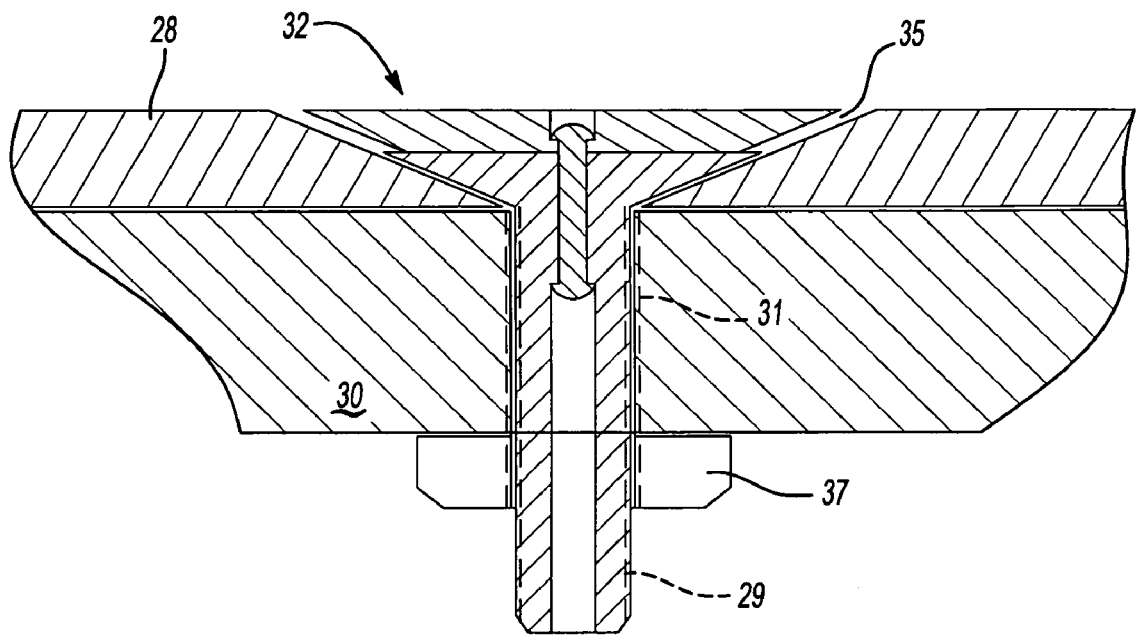
FIG. 2 is cross-sectional view of the exhaust nozzle case showing CMC components attached to the exhaust nozzle case with fasteners.

Referring to FIG. 2, the CMC components 28 are attached to the nozzle case 30 with fasteners 32. The fasteners 32 are located at attachment points 35 and extend through the CMC components 28 and the exhaust nozzle case 30. The fastener 32 includes external threads 29. An internally threaded nut 37 is threaded onto an end of the fastener 32 to retain the fastener 32 against the CMC component 28 and the exhaust nozzle case 30. Alternatively, the fasteners 32 may extend into, but not through, the exhaust nozzle case 30. The fasteners 32 are preferably counter-sunk into the CMC components 28 to provide a relatively even surface to further reduce the heat signature of the turbine engine 10.

Figure 3:
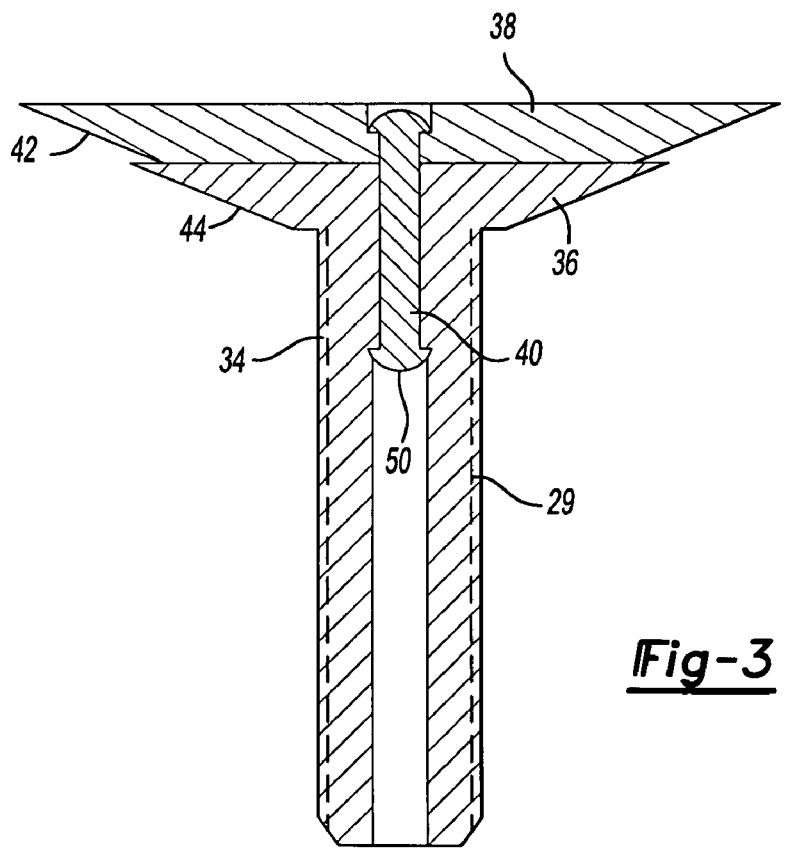
FIG. 3 is a cross-sectional view of a first example fastener of the present invention.

FIG. 3 is a cross-section of a first example fastener 32 of the present invention. The fastener 32 includes a bolt 34 having a head 36. The bolt 34 is preferably made of metal and has external thread 29 for attaching to the nut 37. The bolt 34 my also be threaded into the exhaust nozzle case 30 (as shown in FIG. 2). The exhaust nozzle case 30 may include an internal thread 31 to thread the fastener 32 into the exhaust nozzle case 30.

A CMC cap 38 is located on the head 36 of the bolt 34. The CMC cap 38 is secured to the bolt 34 by a mechanical device, such as a rivet 40. The mechanical device fastening the CMC cap 38 to the bolt 34 allows the CMC cap to have a different thermal expansion than the bolt 34. As is shown, the outer diameter 42 of the CMC cap 38 where it is adjacent to the bolt 34 need not be the same as the outer diameter 44 of the bolt 34.

The CMC cap 38 also acts as a thermal shield for the bolt 34, aiding in the reduction of the heat signature of the turbine engine 10. Because the CMC cap 38 covers, or at least partially covers, the head 36 of the bolt 34, no thermal barrier coatings are required for the bolt 34, as shown in FIG. 3.

Figure 4:
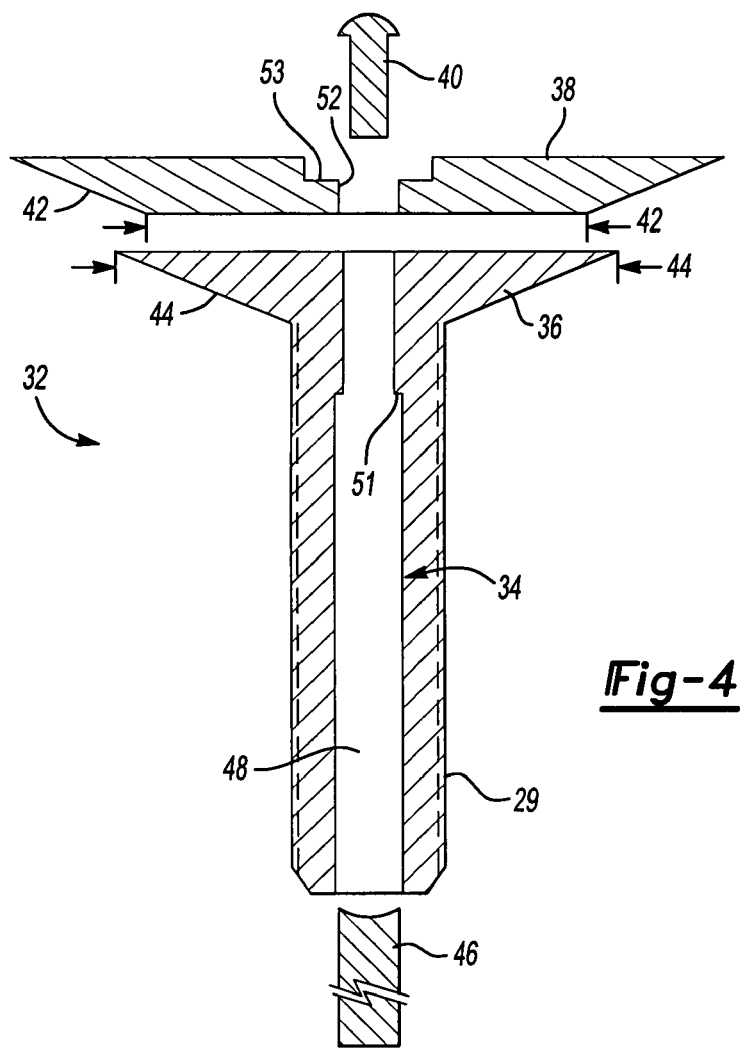
FIG. 4 is an exploded view of the first example fastener of FIG. 3.

FIG. 4 is an exploded view of the example fastener 32. A hole 52 in the CMC cap 38 is aligned with a hole 48 in the bolt 34. The rivet 40 is assembled through the aligned holes 48 and 52. A rivet tool 46 is inserted in the hole 48 in the bolt 34 opposite the head 36. Force is applied to the rivet tool 46, which applies pressure to the rivet 40 to create a deformation 50 (shown in FIG. 3) in the rivet 40. The rivet 40 is made of a softer material than the rivet tool 46, and the deformation 50 in the rivet 40 matches the shape of the rivet tool 46. In the example shown, the rivet tool 46 has a concave shape and the deformation 50 has a convex shape. The deformation 50 now abuts a shoulder 51 in the hole 48 in the bolt 34 and a shoulder 53 in the CMC cap 38. The shoulders 51 and 53 prevent the rivet 40 from removal, retaining the CMC cap 38 to the bolt 34. After assembly of the fastener 32, the rivet tool 46 is removed. The fasteners 32 are assembled prior to attaching the CMC components 28 to the exhaust nozzle case 30.

Figure 5:
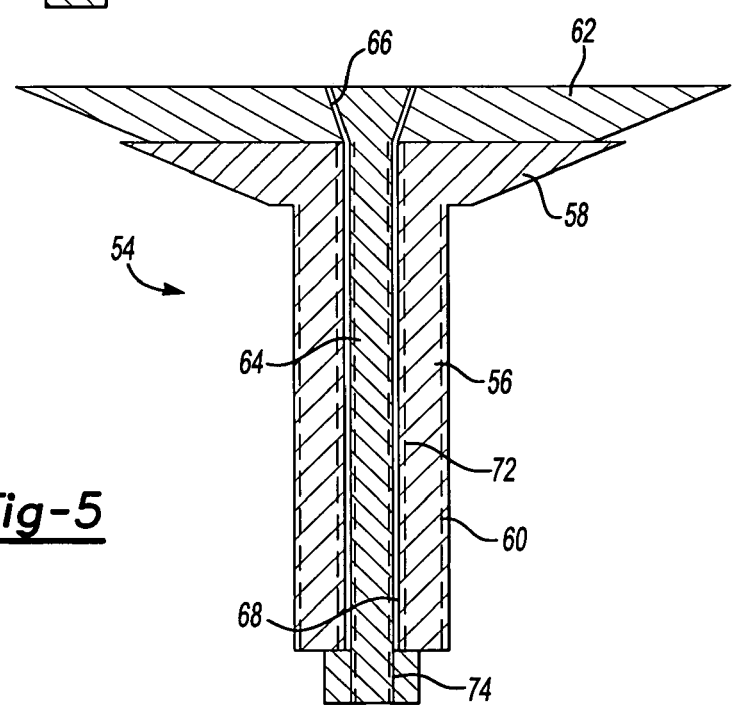
FIG. 5 is a cross-sectional view of a second example fastener of the present invention.

FIG. 5 is a cross-section of a second example fastener 54 of the present invention. The fastener 54 includes a bolt 56 having a head 58. The bolt 56 is preferably made of metal and has an external thread 60 for attaching to the exhaust nozzle case 30 (shown in FIG. 2). A CMC cap 62 is located on the head 58 of the bolt 56. The CMC cap 62 is secured to the bolt 56 by a threaded fastener 64. In one example, the threaded fastener 64 is a screw. The CMC cap 62 has a tapered hole 66, and the bolt 56 has a hole 68. The hole 66 in the CMC cap 62 is aligned with the hole 68 in the bolt 56. The hole 68 has an internal thread 72 to receive the threaded fastener 64. The threaded fastener 64 extends through the hole 66 in the CMC cap 62 and through the hole 68 in the bolt 56. An internally threaded nut 74 is secured to a portion of the threaded fastener 64 that extends from the bolt 56. The nut 74 is tightened onto the threaded fastener 64 to force the CMC cap 62 and the bolt 56 together, applying preload to the CMC cap 62. The nut 74 is preferably a locking nut to prevent the threaded fastener 64 from backing out of the nut 74 due to vibrations of the turbine engine 10. The fasteners 54 are preferably assembled prior to attaching the CMC components 28 to the exhaust nozzle case 30.

Figure 6:
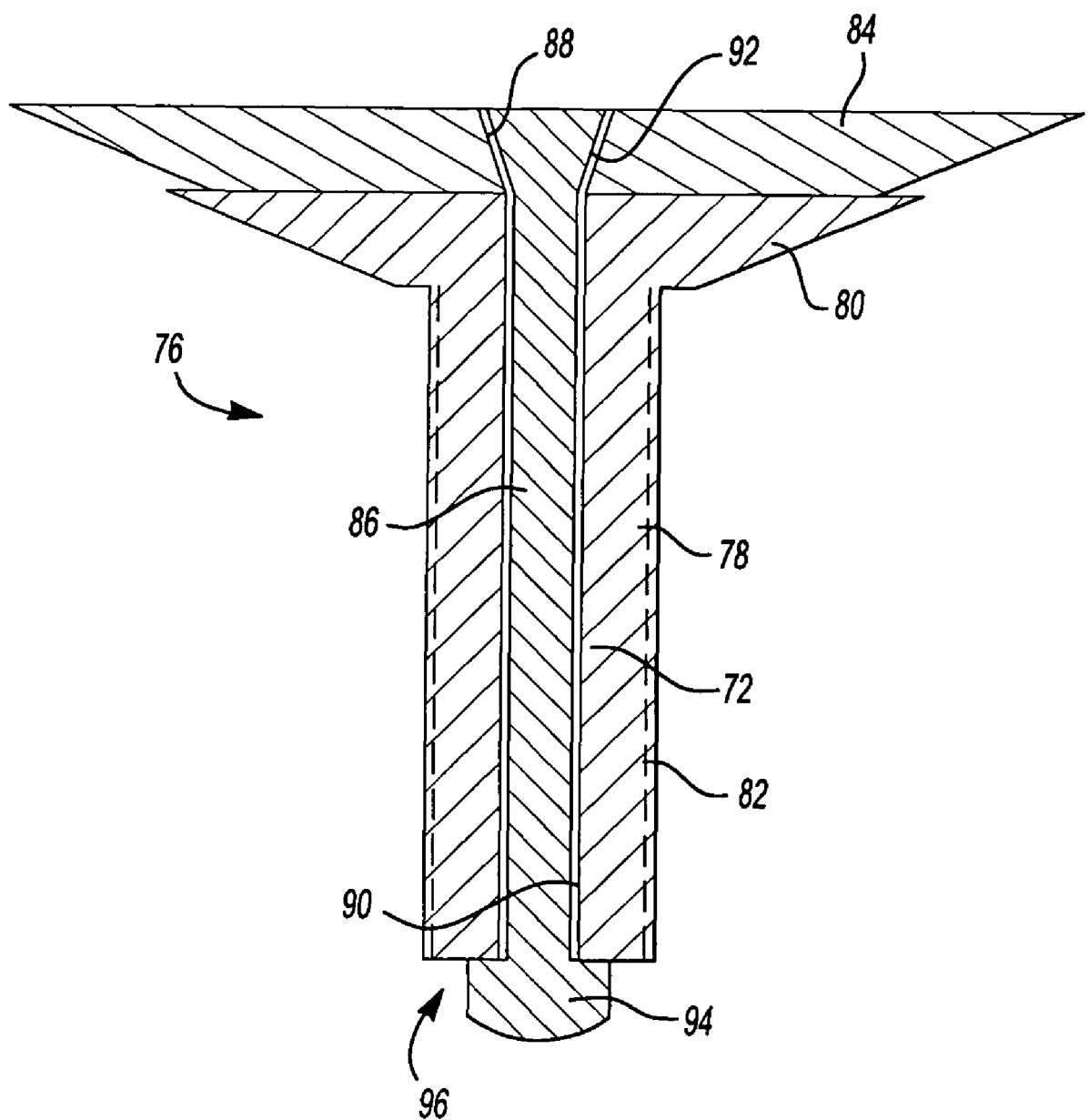
FIG. 6 is a cross-sectional view of a third example fastener of the present invention.

FIG. 6 is a cross-section of a third example fastener 76 according to the present invention. The fastener 76 includes a bolt 78 having a head 80. The bolt 78 is preferably made of metal and has an external thread 82 for attaching to the exhaust nozzle case 30 (shown in FIG. 2). A CMC cap 84 is located on the head 80 of the bolt 78. The CMC cap 84 is secured to the bolt 78 by a rivet or pin 86. The pin 86 extends through a tapered hole 88 in the CMC cap 84 and through a hole 90 in the bolt 78. The pin 86 has a head 92 to retain the pin 86 within the tapered hole 88 in the CMC cap 84. A deformation 94 is formed at a second end 96 of the pin 86 after the pin 86 has been inserted through the holes 88 and 90. The deformation 94 and the head 92 prevent the pin 86 from removing from the hole 88 to retain the CMC cap 84 to the bolt 78. The deformation 94 can be formed using a rivet tool or by bending the second end 96 of the pin 86 such that the second end 96 is not linear with the remainder of the pin 86.

In the embodiments described, the fasteners 32, 54 and 76 are described as attaching the CMC component 28 to the exhaust nozzle case 30. The fasteners 32, 54 and 76 can also be utilized to attach any component comprising CMC material to any metal structure supporting that CMC component and are not limited to the exhaust nozzle liners and the exhaust nozzle case.

The CMC caps 38, 62 and 84 are attached to the bolts 34, 56 and 78 to assemble the fasteners 32, 54 and 76 as described above. Thereafter, the CMC components 28 are aligned such that the attachment points 35 in the CMC components 28 align with fastener holes in the exhaust nozzle case 30. The fasteners 32, 54 and 76 are threaded through both the attachment point 35 and the fastener hole to secure the CMC components 28 to the exhaust nozzle case 30. A nut 37 is threaded onto the externally threaded fastener 32, 54 and 76 to retain the fastener 32, 54 and 76 against the CMC component 28 and the exhaust nozzle case 30.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A turbine engine comprising:
   a ceramic composite component;
   a structural component;
   a fastener for attaching the ceramic composite component to the structural component, wherein the fastener includes a metal member having a head and a ceramic composite cap to at least partially cover the head of the metal member; and
   a mechanical attachment to attach the ceramic composite cap to the metal member, wherein the ceramic composite cap comprises a cap through hole and the metal member comprises a member through hole that are both internally threaded, wherein an external thread of the metal threaded member is threaded in the cap through hole and the member through hole.

2. The turbine engine of claim 1, wherein the mechanical attachment further comprises a locking nut that is internally threaded and threaded on a portion of the metal threaded member extending from the member through hole.

3. The turbine engine of claim 1, wherein the structural component is a nozzle case and the ceramic composite component is a nozzle lining.

4. The turbine engine of claim 1, wherein the structural component comprises a metal material.

5. An attachment apparatus for attaching a ceramic composite component to a metal structural component in a turbine engine, the attachment apparatus comprising:
   a metal member having a head;
   a ceramic composite cap to at least partially cover the head of the metal member; and
   a mechanical attachment to secure the ceramic composite cap to the metal member, wherein the mechanical attachment comprises a metal threaded member having an external thread, wherein the ceramic composite cap comprises an internally threaded cap through hole and the metal member comprises an internally threaded member through hole, wherein the external thread of the metal threaded member is threaded in the cap through hole and the member through hole.

6. The turbine engine of claim 5, wherein the mechanical attachment further comprises a locking nut that is internally threaded and threaded on a portion of the metal threaded member extending from the member through hole.

7. A method of fastening components comprising the steps of:
   aligning a ceramic composite cap to at least partially cover a head of a metal member;
   placing a mechanical attachment through a cap through hole in the ceramic composite cap and a member through hole in the metal member; and
   mechanically attaching the ceramic composite cap to the metal member to form a fastener.

8. The method of claim 7, wherein the components are a ceramic composite fastener and a metal structural component, the method further comprising the steps of:
   aligning a ceramic through hole in the ceramic component with a structural through hole in the metal structural component; and
   inserting the fastener through the ceramic through hole and the structural through hole to fasten the ceramic component to the metal structural component.

9. The method of claim 7, wherein the mechanical attachment is a metal rivet, and the step of mechanically attaching comprises deforming a portion of the metal rivet with a rivet tool to retain the metal rivet within the cap through hole and the member through hole.

10. The method of claim 7, wherein the mechanical attachment is a metal threaded member, and the step of mechanically attaching comprises threading an internally threaded locking nut onto an external thread of the metal threaded member extending from the member through hole.

\* \* \* \* \*